United States Patent [19]
Tamura

[11] Patent Number: 5,713,530
[45] Date of Patent: Feb. 3, 1998

[54] FILM WINDER

[75] Inventor: Hiroaki Tamura, Wakayama, Japan

[73] Assignee: Noritsu Koki Co., Ltd., Wakayama, Japan

[21] Appl. No.: 801,020

[22] Filed: Feb. 19, 1997

[30] Foreign Application Priority Data

Feb. 21, 1996 [JP] Japan ................................. 8-33693

[51] Int. Cl.⁶ ............................................. G03B 1/00
[52] U.S. Cl. ............................. 242/333.2; 396/413
[58] Field of Search ............................ 242/333.2, 344, 242/355, 355.1, 357, 534; 396/413

[56] References Cited

U.S. PATENT DOCUMENTS

| | | | |
|---|---|---|---|
| 3,695,551 | 10/1972 | Lida et al. | 242/344 |
| 4,306,794 | 12/1981 | Fukahori et al. | 396/413 |
| 4,428,657 | 1/1984 | Tazuka | 396/413 |
| 4,568,164 | 2/1986 | Sahori | 396/413 |

*Primary Examiner*—John P. Darling
*Attorney, Agent, or Firm*—Wenderoth, Lind & Ponack

[57] ABSTRACT

A film winder which can stop the rotation of a film winding spool at a constant position. The film winder has a drive pin for rotating the spool in a film cartridge. The drive pin carries a gear having a boss formed with a flat engaging portion on its outer periphery. A stopper member is provided which can pivot and engage the engaging portion. The spool is rotated by the drive pin to wind film around the spool. After a film detection sensor provided near the opening of the cartridge has detected the passage of the film tip, the stopper member is pivoted toward the boss and engages the engaging portion of the boss, thus stopping the drive pin. The spool can thus be stopped at a constant position.

4 Claims, 3 Drawing Sheets

FILM WINDER

BACKGROUND OF THE INVENTION

This invention relates to a film winder for rewinding a film pulled out of a film cartridge into the film cartridge.

In a typical conventional photoprinting method, a developed film wound around a spool of a cartridge is pulled out of the cartridge through its opening, fed to an exposure unit of a photoprinter for printing, and rewound into the cartridge.

FIGS. 4A, 4B and 4C show a film cartridge of this type. The cartridge 1 has a film winding spool 2 having its both ends extending through and supported by side walls of the cartridge 1. Pin holes 3 and 4 are formed in the respective end faces thereof. A cover 6 is provided to close a film inlet/outlet opening 5. The cover 6 has shafts 7a and 7b at both ends which extends through and supported by the side walls of the cartridge 1. The shafts 7a and 7b have pin holes 8 and 9 in their respective end faces.

Since a film is completely pulled into the cartridge 1, the cartridge 1 is provided with a visual check means that permits visual checking of the state of the film inside. This means comprises a display plate 10 mounted on one end of the spool 2 and having a protrusion 11, and a plurality of holes 12a, 12b, 12c, 12d. Depending upon through which one of these holes the protrusion 11 is seen, it is possible to determine the state of the film, i.e. whether the film is unexposed, partially exposed, entirely exposed, or developed.

A conventional film winder for winding a film into a film cartridge of the above type has a film sensor provided in a feed path of film being pulled out through the opening 5. When the sensor detects the passage of film, a motor for a drive pin engaged in the pin hole 3 of the spool 2 is deactivated.

This conventional film winder depends on the sensor to control the spool, so that the position where the spool stops tends to vary. This makes unreliable the determination of the film state by the above visual check means.

Ordinarily, film is wound with tension applied thereto, so that the film is tightly wound around the spool. When the film has been completely wound around the spool, the film tends to loosen, which causes slight rotation of the spool. The spool stop position thus changes.

An object of this invention is to provide a film winder which can stop the spool at a constant position.

SUMMARY OF THE INVENTION

According to this invention, there is provided a film winder having a film detection sensor provided in a feed path of film being pulled out of a film cartridge through its opening, and adapted to wind the film around a spool provided in the cartridge by rotating the spool, and to stop a driving motor for a drive pin for rotating the spool after the film detection sensor has detected the passage of a tip of the film, the film winder comprising a gear for transmitting driving force to the drive pin, the gear having a boss formed with an engaging portion on its outer periphery, a stopper member capable of pivoting into engagement with the engaging portion, and a pivoting means for pivoting the stopper member into engagement with the engaging portion.

The pivoting means may comprise a contact piece provided on the stopper member, a lever having its front end disposed near the contact piece, and a solenoid coupled to the rear end of the lever for pivoting the lever toward the contact piece and pushing the contact piece.

This winder can stop the rotation of the spool at a constant position by bringing the stopper member into engagement with the engaging portion.

Other features and objects of the present invention will become apparent from the following description made with reference to the accompanying drawings, in which:

DETAILED DESCRIPTION OF THE PREFERRED EMBODIMENT

Figure 1:
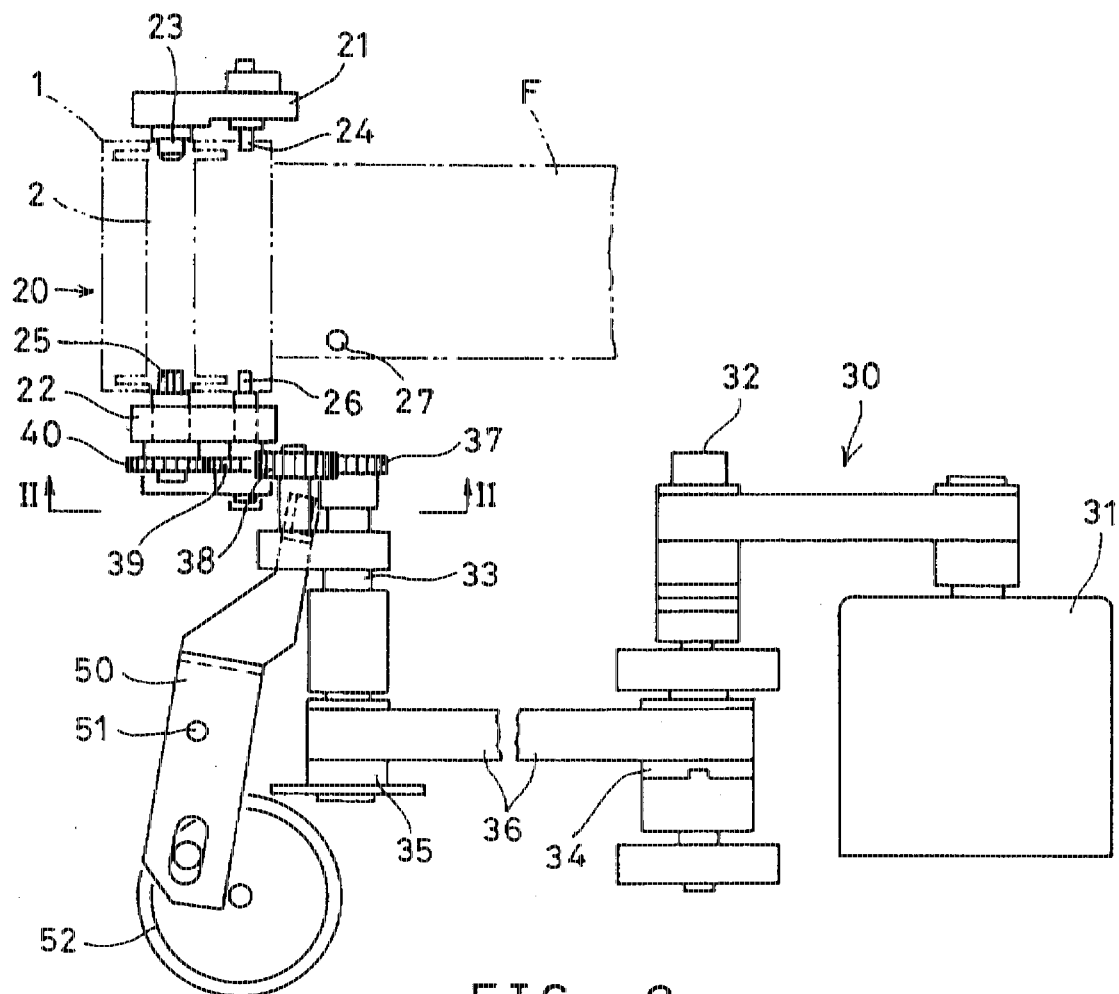
FIG. 1 is a plan view of a film winder embodying this invention.

The embodiment of this invention is now described with reference to FIGS. 1–3.

As shown, a pair of support plates 21, 22 are provided on both sides of a support portion 20 on which is placed a cartridge 1. The support plates 21, 22 are movable relative to each other and moved by an unillustrated drive means.

Figure 4A:
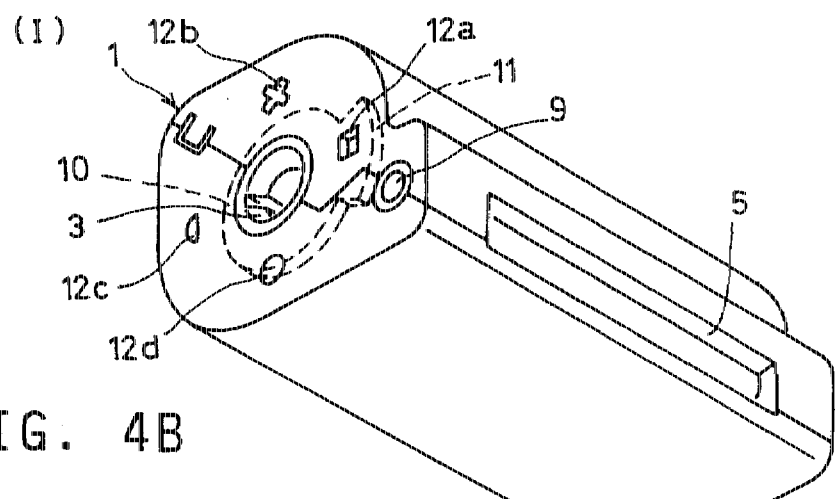
FIG. 4A is a perspective view of a film cartridge.
Figure 4B:
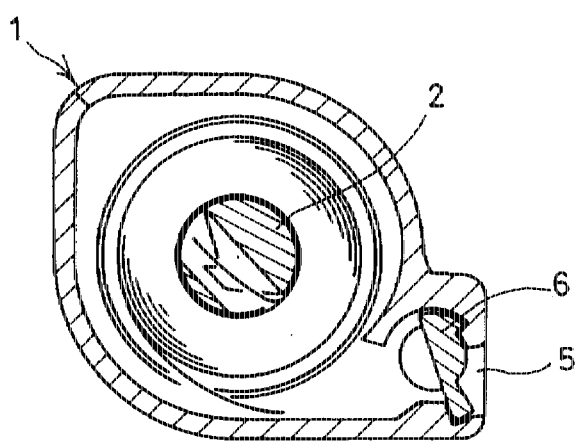
FIG. 4B is its side view in vertical section.
Figure 4C:
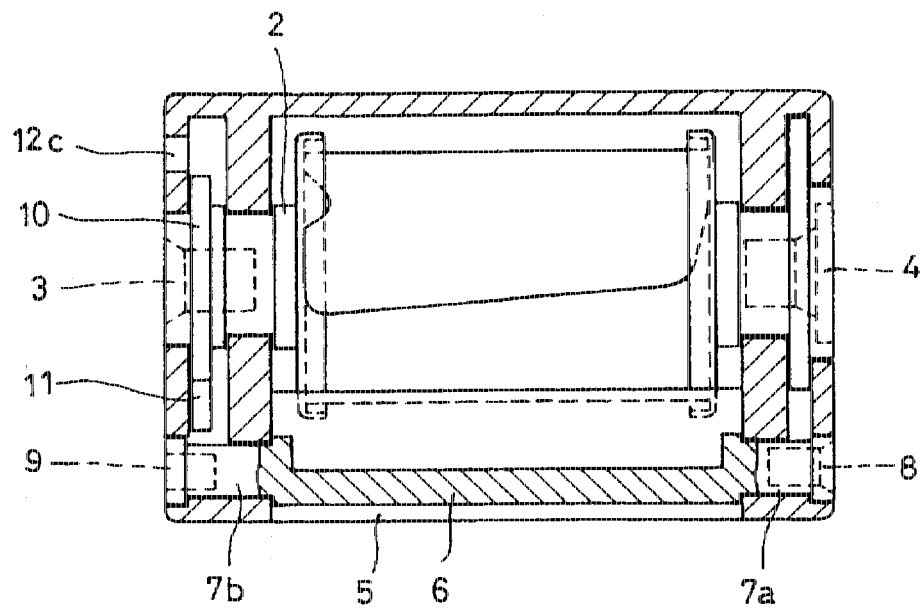
FIG. 4C is its plan view in cross-section.

Of the pair of support plates 21, 22, the support plate 21 has a support pin 23 and an engaging pin 24. The support pin 23 can be inserted into the pin hole 4 formed in an end face of the spool 2 of the cartridge 1 shown in FIG. 4. The engaging pin 24 can be inserted into the pin hole 8 formed in the end of the shaft 7a of the cover 6.

The cover 6 is opened and closed by rotating the engaging pin 24 with a drive means.

The other support plate 22 carries a drive pin 25 and a support pin 26. The drive pin 25 is engageable in the pin hole 3 formed in one end face of the spool 2 of the cartridge 1 shown in FIG. 4. The support pin 26 can be inserted into the pin hole 9 formed in the end of the shaft 7b of the cover 6.

The cartridge 1 is unmovably supported on the support portion 20 with the support pins 23, 26 inserted in the pin holes 4 and 9 and the engaging pin 24 and the drive pin 25 engaged in the pin holes 3 and 8. In the feed path of film being pulled out of the cartridge 1 through its opening 5, a sensor 27 is provided which detects the film by abutting the edge of the opening 5.

The drive pin 25 provided on the support plate 22 is rotated by a drive unit 30.

The drive unit 30 comprises a motor 31, a first shaft 32 having a pulley 34 and rotated by the motor 31, a second shaft 33 extending parallel to the first shaft 32 and carrying a pulley 35, and a belt 36 connecting the pulley 34 to the pulley 35, thus transmitting the rotation of the first shaft 32 to the second shaft 33.

The second shaft 33 also has a first gear 37 in mesh with a second gear 38 which is in turn in mesh with a third gear 39 provided at one end of the support pin 26. The third gear 39 is in mesh with a fourth gear 40 provided at one end of the drive pin 25. Thus, the rotation of the first gear 37 is transmitted to the fourth gear 40.

The third gear 39 and the fourth gear 40 have the same diameter.

The pulley 34 mounted on the first shaft 32 is supported on the first shaft through an unillustrated friction mechanism. When the pulley 34 is subjected to a load greater than a level permitted by the friction mechanism, the pulley 34 is adapted to stop, allowing the first shaft 32 to idle.

Figure 2:
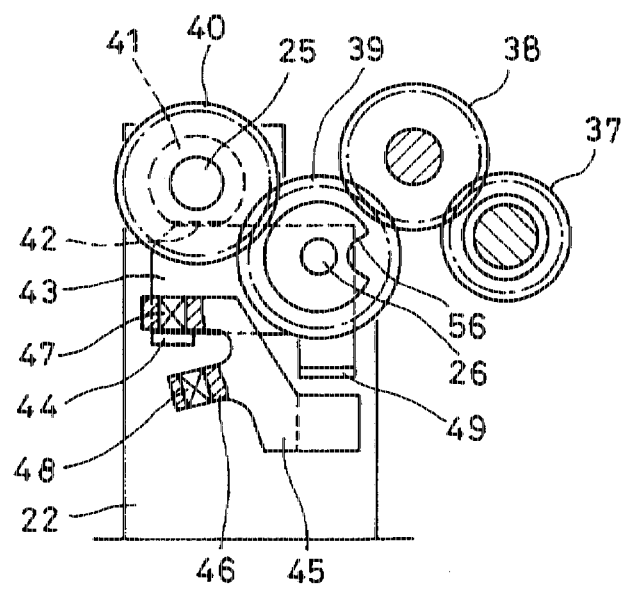
FIG. 2 is a sectional view taken along line II—II of FIG. 1.
Figure 3A:
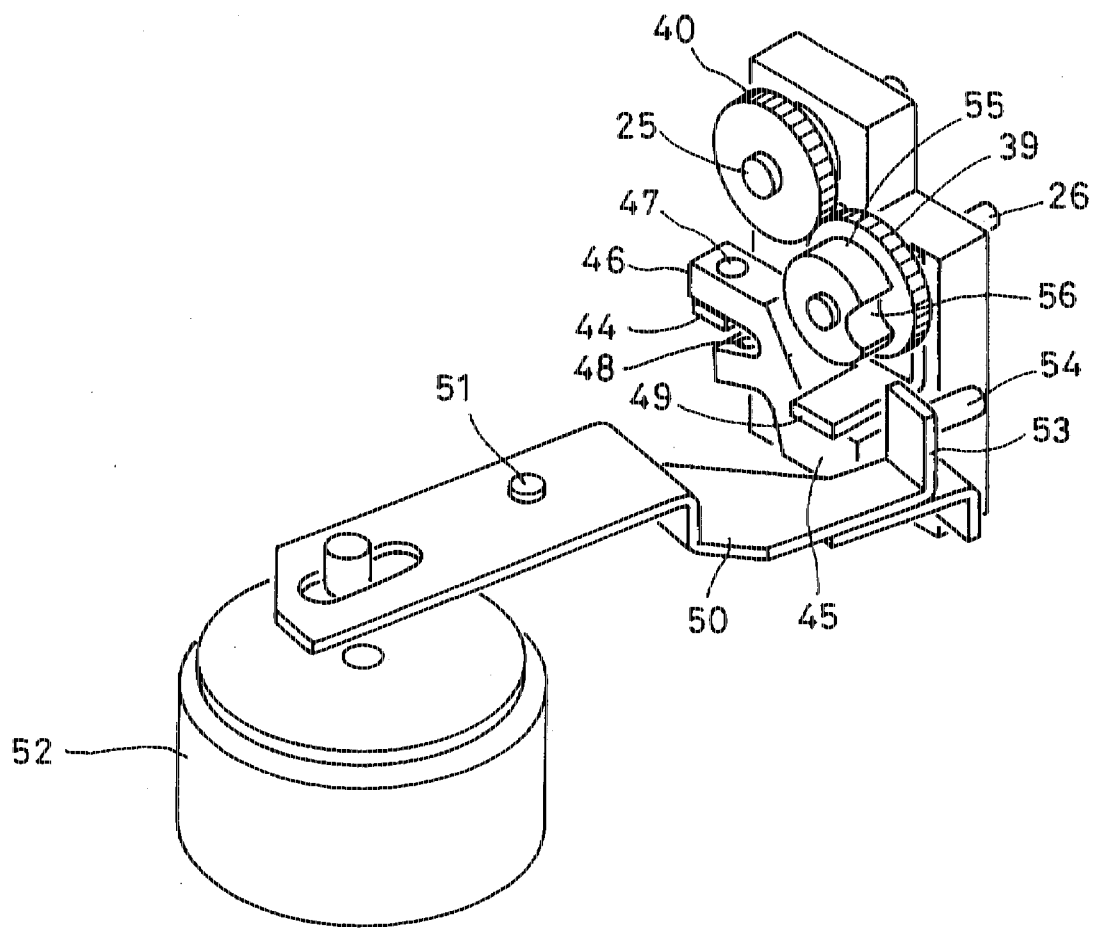
FIGS. 3A and 3B are partial perspective views of of the device of FIG. 1.
Figure 3B:
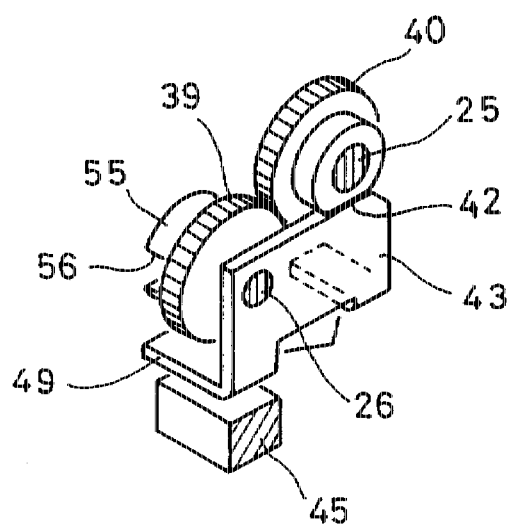

As shown in FIGS. 2 and 3, the fourth gear 40 has a boss 41 having on its outer periphery a flat portion 42 as a rotation stopper. A stopper member 43 in the shape of a plate piece is engageable with the flat portion 42 by pivoting about the support pin 26. By engaging the flat portion 42, the stopper member 43 stops the rotation of the drive pin 25.

The stopper member 43 has a magnetic piece 44 at its pivoting end. The magnetic piece 44 is disposed between bifurcated arms 46 of a magnet support 45 mounted on the support plate 22. The bifurcated arms 46 carry magnets 47 and 48. When the magnetic piece 44 is attracted to the upper magnet 47, the stopper member 43 engages the flat portion 42. When the magnetic piece 44 is attracted to the lower magnet 48, the stopper member 43 is not in engagement with the flat portion 42.

The stopper member 43 has a flange 49 at its rear end. Near the flange 49 is disposed the tip of a lever 50. The lever 50 is pivotable about a pin 51. A rotary solenoid 52 is coupled to the rear end of the lever 50. When the sensor 27 shown in FIG. 1 detects the passage of film F, the solenoid 52 is activated to pivot the lever 50 in a direction to push the flange 49.

The lever 50 has at its tip a pin support piece 53 carrying an engaging pin 54 engageable in a cutout 56 formed in the outer periphery of a boss 55 of the third gear 39.

When the motor 31 is activated with the film F pulled out of the cartridge 1 set on the support portion 20, the drive pin 25 and the spool 2 are rotated, so that the film F is wound around the spool 2.

After a predetermined time has passed since the sensor 27 detected the passage of the tip of film F, the rotary solenoid 52 is activated to pivot the lever 50 and push the flange 49 of the stopper member 43 with the tip of the lever 50.

As the lever 50 pivots in this direction, the engaging pin 54 abuts the outer periphery of the boss 55 of the third gear 39, and when the cutout 56 registers with the pin 54, the pin 54 engages in the cutout 56, stopping the rotation of the third gear 39.

Also, the pivoting lever 50 pushes the flange 49 of the stopper member 43 to pivot the stopper member 43 toward the fourth gear 40 until its tip abuts the outer periphery of the boss 41 of the fourth gear 40. Thus, simultaneously when the engaging pin 54 engages in the cutout 56, the stopper member 43 engages the flat portion 42 formed on the boss 41 of the fourth gear 40, thus stopping the rotation of the fourth gear 40.

Since the rotation of the third gear 39 and the fourth gear 40 is stopped after the tip of the film F has passed by the sensor 27, the spool 2 is stopped at a constant position. After the spool rotation has stopped, the motor 31 is deactivated. The film has been wound around the spool.

When the stopper member 43 stops the rotation of the fourth gear 40 by engaging the flat portion 42, the tip of the film F is already pulled into the cartridge 1. In this state, the upper magnet 47 attracts the magnetic piece 44 on the stopper member 43, keeping the stopper member 43 in engagement with the flat portion 42. Thus, even if the engaging pin 54 comes out of the cutout 56 due to untimely pivoting of the lever 50, the fourth gear 40 is restrained from rotation, so that the spool 2 will never rotate even if the wound film F should loosen.

In the embodiment, the rotation of the spool 2 can be stopped reliably by engaging the pin 54 in the cutout 56 formed in the boss 55 of the third gear 39 and further by bringing the stopper member 43 into engagement with the flat portion 42 formed on the boss 41 of the fourth gear 40.

According to this invention, after the sensor has detected the passage of the tip of film, the stopper member is pivoted into engagement with the flat portion formed on the outer periphery of the boss of the fourth gear to stop the rotation of the spool, so that the spool can be stopped at a constant position.

When the stopper member engages the fourth gear, the upper magnet attracts the magnetic piece mounted on the stopper member, keeping the stopper member in engagement with the fourth gear. Thus, even if the force urging the stopper member toward the engaging position should disappear, the magnet will keep the stopper member in this position, stopping the rotation of the fourth gear and the spool. Thus, even if the film wound around the spool loosens, the spool will not rotate.

What is claimed is:

1. A film winder having a film detection sensor provided in a feed path of film which is pulled out of a film cartridge through its opening, and adapted to wind the film around a spool provided in said cartridge by rotating said spool, and to stop a motor for a drive pin for rotating said spool after said film detection sensor has detected the passage of a tip of the film, said film winder comprising a gear for transmitting driving force to said drive pin, said gear having a boss formed with an engaging portion on its outer periphery, a stopper member capable of pivoting into engagement with said engaging portion, and a pivoting means for pivoting said stopper member into engagement with said engaging portion after said film detection sensor has detected the passage of a tip of the film.

2. A film winder as claimed in claim 1 wherein said pivoting means comprises a contact piece provided on said stopper member, a lever pivotally mounted with its front end disposed near said contact piece, and a solenoid coupled to the rear end of said lever for pivoting said lever toward said contact piece and pushing said contact piece after said film detection sensor has detected the passage of a tip of the film.

3. A film winder as claimed in claim 2 wherein said stopper member has a magnetic piece, and wherein said film winder further comprises a magnet for attracting said magnetic piece when said stopper member is in engagement with said engaging portion.

4. A film winder as claimed in claim 1 wherein said stopper member has a magnetic piece, and wherein said film winder further comprises a magnet for attracting said magnetic piece when said stopper member is in engagement with said engaging portion.

* * * * *